United States Patent
Keng et al.

(10) Patent No.: US 7,689,004 B2
(45) Date of Patent: Mar. 30, 2010

(54) METHOD AND APPARATUS FOR EVALUATING THE QUALITY OF DOCUMENT IMAGES

(75) Inventors: Brian Keng, Thornhill (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 869 days.

(21) Appl. No.: 11/531,146

(22) Filed: Sep. 12, 2006

(65) Prior Publication Data

US 2008/0063240 A1 Mar. 13, 2008

(51) Int. Cl.
*G06K 9/00* (2006.01)
*G06Q 40/00* (2006.01)

(52) U.S. Cl. .................................. 382/112; 235/379
(58) Field of Classification Search ............. 382/112, 382/135–140, 170, 173, 306, 309, 225, 286, 382/289; 235/375, 379; 348/92; 702/81, 702/84; 705/45
See application file for complete search history.

(56) References Cited

U.S. PATENT DOCUMENTS

| | | | |
|---|---|---|---|
| 5,754,674 A * | 5/1998 | Ott et al. | 382/112 |
| 5,870,508 A | 2/1999 | Park | |
| 5,901,253 A | 5/1999 | Tretter | |
| 6,115,509 A | 9/2000 | Yeskel | |
| 6,310,984 B2 | 10/2001 | Sansom-Wai et al. | |
| 6,418,244 B2 | 7/2002 | Zhou et al. | |
| 6,587,576 B1 * | 7/2003 | Wesolkowski | 382/112 |
| 6,863,214 B2 * | 3/2005 | Garner et al. | 235/379 |
| 6,912,297 B2 | 6/2005 | Scott et al. | |
| 7,167,580 B2 * | 1/2007 | Klein et al. | 382/112 |
| 2001/0014183 A1 | 8/2001 | Sansom-Wai et al. | |
| 2003/0133623 A1 | 7/2003 | Lee et al. | |
| 2004/0264805 A1 | 12/2004 | Harada et al. | |
| 2005/0175221 A1 | 8/2005 | Scott et al. | |

* cited by examiner

Primary Examiner—Abolfazl Tabatabai

(57) ABSTRACT

A method of evaluating the quality of an image of a document comprises examining the image to determine if the image satisfies at least one parameter-based image metric and examining the image to determine if the image satisfies a plurality of order-dependent image metrics.

21 Claims, 16 Drawing Sheets

```
 1  2  3  4  5
 6 A1 A2 A3  7
 8  X  X  X  9
10 A4 A5 A6 11
12 13 14 15 16
```

US 7,689,004 B2

METHOD AND APPARATUS FOR EVALUATING THE QUALITY OF DOCUMENT IMAGES

FIELD OF THE INVENTION

The present invention relates generally to image analysis and in particular to a method and apparatus for evaluating the quality of document images.

BACKGROUND OF THE INVENTION

Document imaging is well known in the art. When scanning documents of value such as for example cheques, ensuring that the resultant document images are of sufficient quality for subsequent processing is important. Various techniques for assuring image quality have been considered.

For example, U.S. Pat. No. 6,912,297 and U.S. Patent Application Publication No. 2005/0175221 to Scott et al. disclose a method of determining whether a cheque document in an image has a torn or folded corner. A tracing algorithm is used to trace along a diagonal line of pixels from a corner of the cheque document within the image. If the pixel located in the expected position of the corner of the cheque document does not represent part of the cheque document, the pixels along the diagonal line are checked in succession. If pixels representing part of the cheque document are found along the diagonal line, the path of the diagonal line is deviated and pixels along the deviated diagonal line are checked in succession to determine if they represent part of the cheque document. If the number of consecutive pixels along the deviated diagonal path that do not represent the cheque document exceeds a threshold, a tear or fold is deemed to be present. In order to distinguish between folds and tears, the first pixel representing part of the cheque document is located along both sides of the expected edges of the cheque document from the corner. A straight line is determined between these two pixels, and pixels adjacent this straight line along each row or column are checked to determine if the missing portion of the cheque document represents a fold or a tear.

U.S. Pat. No. 5,754,674 to Ott et al. discloses a method and system for determining whether a cheque image is acceptable. A first normal sensitivity image and a second more intense sensitivity image of a cheque are captured. Speckle filtering is performed on both cheque images. Clusters of black pixels are grouped and classified as stroke-like or otherwise based on a number of statistics. If a cluster of black pixels in the first cheque image is classified as stroke-like, but is not recognized, the second cheque image is analyzed to determine if the particular cluster of black pixels forms part of another cluster of black pixels.

U.S. Pat. No. 5,870,508 to Park discloses a method of aligning a document image using horizontal and vertical alignment lines placed on a document in the image. The alignment lines are located in the document image, and one or more translations required to translate the document in the image into a correctly-aligned orientation are determined using the alignment lines. The document image is then oriented using the determined translations.

U.S. Pat. No. 5,901,253 to Tretter discloses a method of determining the skew angle of a document image. The edge of the document in the image is determined by comparing each line scanned with that of a background when the document is not present. The first and last pixels forming part of the document in each scan line are registered and collectively form the edge. The slope of the detected edge is then determined and used to calculate the orientation of the document in the image.

U.S. Pat. No. 6,310,984 and U.S. Patent Application Publication No. 2001/0014183 to Sansom-Wai et al. disclose a system and method for automatically determining the presence of extraneous information in a cheque image. The extraneous information is then ignored to determine the skew of the cheque document in the image.

U.S. Pat. No. 6,587,576 to Wesolkowski discloses a method of determining the quality of a grayscale cheque image. A two-dimensional histogram of the cheque image is generated using the grayscale values of the pixels in the cheque image. One axis of the histogram represents the foreground or actual grayscale values of the pixels. The other axis of the histogram represents the background values of the pixels, calculated as the average grayscale value of a surrounding N×N pixel window. The centers of background and foreground pixel clusters are determined and the normalized distance therebetween is calculated. This distance is used to determine the quality of the cheque image.

Although the above references disclose techniques for evaluating the quality of document images, improvements to assure image quality are desired. It is therefore an object of the present invention to provide a novel method and apparatus for evaluating the quality of document images.

SUMMARY OF THE INVENTION

Accordingly, in one aspect there is provided a method of evaluating the quality of an image of a document comprising:

examining the image to determine if the image satisfies at least one parameter-based image metric; and examining the image to determine if the image satisfies a plurality of order-dependent image metrics.

In one embodiment, the image is firstly examined to determine if the image satisfies a plurality of parameter-based image metrics. During the first examining, image dimensions are compared with thresholds to determine if the image is at least one of (i) oversized, (ii) undersized, (iii) has a file size below a minimum file size, and (iv) has a file size greater than a maximum file size. In situations where images of a document are examined in pairs, during the first examining, the dimensions of the images in each pair are also compared to detect mismatched images.

During examining of the image to determine if the image satisfies a plurality of order-dependent image metrics, the image is examined firstly to detect the existence a frame surrounding the document, then to detect document skew, and then to detect at least one of (i) folded or torn document corners, (ii) folded or torn document edges, (iii) the existence of a carbon strip on the document and (iv) document piggyback.

During frame existence detecting, a bounding region delineating the document in the image is determined and the size of the frame surrounding the bounding region is compared with a threshold to determine if the frame exceeds a frame size limit. If the frame does not exceed the frame size limit, the frame is removed from the image thereby to generate a frame corrected image. During document skew existence detecting, the bounding region in the frame corrected image is rotated and the angle of rotation is compared with a threshold to determine if the angle of rotation exceeds a limit.

During folded or torn document corner detecting, at least one corner of the frame and skew corrected image is examined to detect the existence of a black pixel cluster. In one embodiment, the frame and skew corrected image is divided into pixel blocks and the pixels within the pixel block at the corner of the frame and skew corrected image are examined to determine if the average value of the pixels is below a threshold level signifying the existence of the black pixel cluster. If a black pixel cluster exists, pixels of adjacent pixel blocks are similarly examined to delineate the boundaries of the black pixel cluster.

During folded or torn document edge detecting, at least one edge of the frame and skew corrected image is examined to detect the existence of black pixel clusters. In one embodiment, the frame and skew corrected image is divided into pixel blocks and the pixels within the pixel block along the edge of the frame and skew corrected image are examined to determine if the average value of the pixels is below a threshold level signifying the existence of the black pixel cluster. If a black pixel cluster exists, pixels of adjacent pixel blocks are similarly examined to delineate the boundaries of the black pixel cluster.

According to another aspect there is provided an apparatus for evaluating the quality of an image of a document comprising:

a parameter-based metrics evaluator examining the image to determine if the image satisfies at least one parameter-based image metric; and an order-dependent metrics evaluator examining the image to determine if the image satisfies a plurality of order-dependent image metrics.

According to yet another aspect there is provided a computer readable medium embodying a computer program for evaluating the quality of an image of a document, said computer program comprising:

computer program code for examining the image to determine if the image satisfies at least one parameter-based image metric; and computer program code for examining the image to determine if the image satisfies a plurality of order-dependent image metrics.

By performing both parameter-based and order-dependent checks on document images, the quality of the documents in the images can be assured. In this manner, documents in images that are not suitable for further processing can be readily detected.

BRIEF DESCRIPTION OF THE DRAWINGS

An embodiment will now be described more fully with reference to the accompanying drawings in which.

DETAILED DESCRIPTION OF THE EMBODIMENTS

Figure 1:
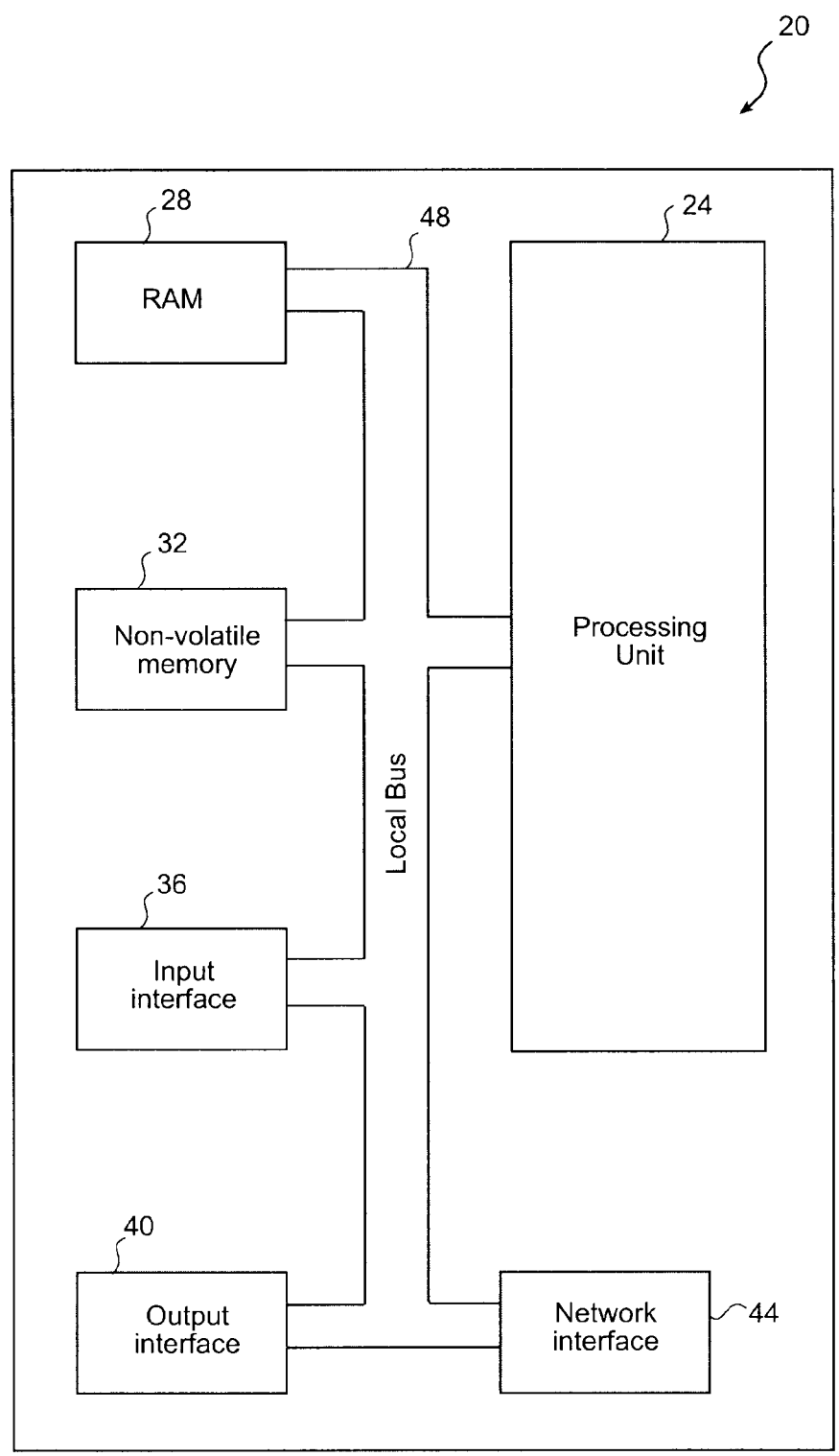
FIG. 1 is a schematic diagram of an apparatus for evaluating the quality of cheque images.

Turning now to FIG. 1, an apparatus 20 for evaluating the quality of cheque images is shown. As can be seen, the apparatus 20 comprises a processing unit 24, random access memory ("RAM") 28, non-volatile memory 32, an input interface 36, an output interface 40 and a network interface 44, all in communication over a local bus 48. The processing unit 24 retrieves a cheque image evaluation application from the non-volatile memory 32 into the RAM 28. The cheque image evaluation application is then executed by the processing unit 24. The non-volatile memory 32 also stores cheque images to be evaluated. The input interface 36 may include for example, a keyboard, a mouse and/or other user input device. The output interface 40 includes a display for presenting information to a user of the apparatus 20 to allow interaction with the cheque image evaluation application. The network interface 44 allows cheque images to be evaluated, to be received via a communication network to which the apparatus 20 is coupled and allows evaluated cheque images to be sent to downstream processing equipment for further processing.

Figure 2:
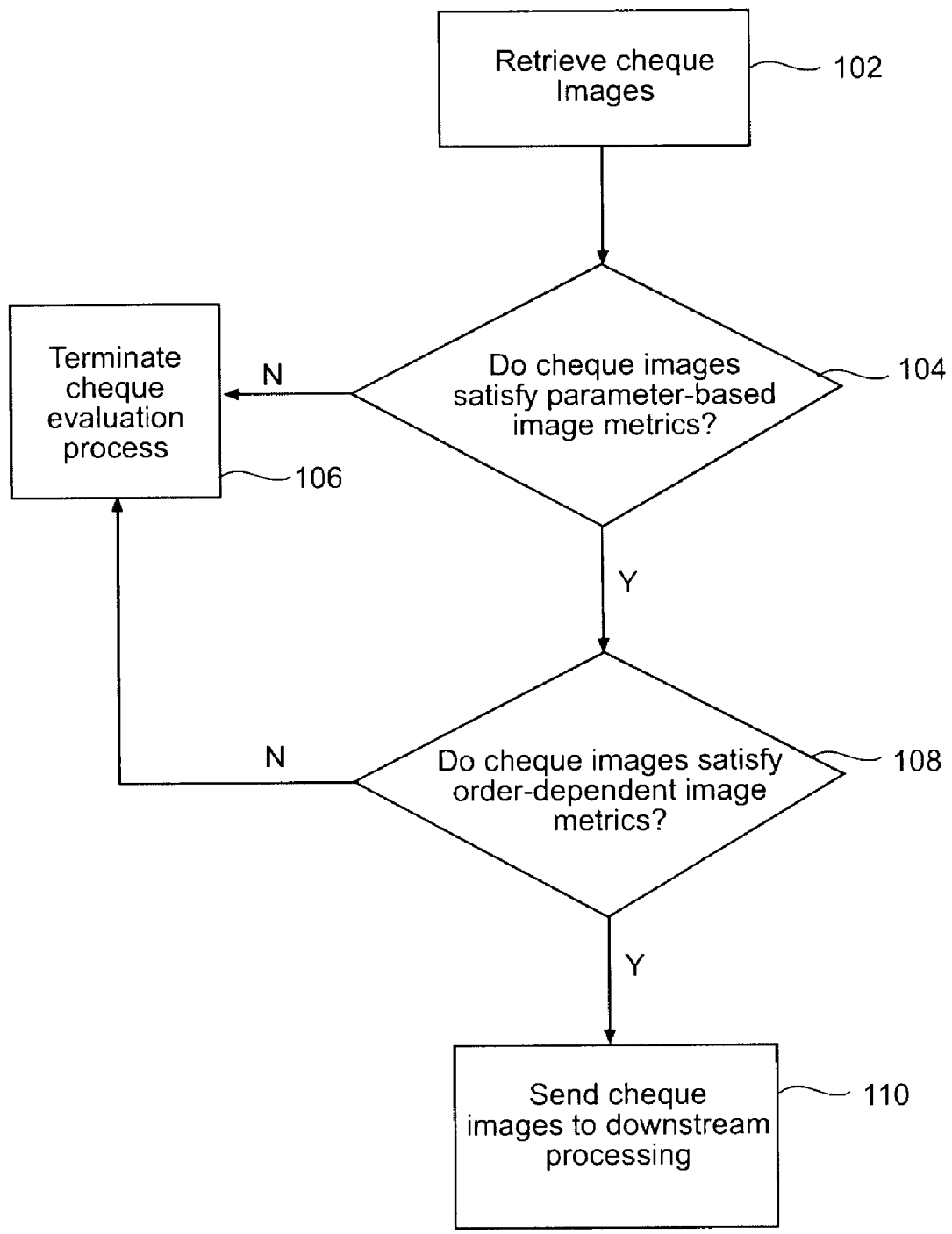
FIG. 2 is a flowchart showing the general steps performed by the apparatus of FIG. 1 during cheque image evaluation.

Turning now to FIG. 2, a flowchart showing the general steps performed by the apparatus 20 during cheque image evaluation is shown. With the cheque image evaluation application being executed by the processing unit 24, when the front and back of a cheque have been scanned and the resulting cheque images are to be evaluated for quality, the front and back cheque images are retrieved by the processing unit 24 from the non-volatile memory 32 into the RAM 28 (step 102). Once retrieved, the processing unit 24, in response to the cheque image evaluation application, processes the cheque images to evaluate their quality. In particular, with the cheque images loaded into the RAM 28, the cheque images are firstly examined to determine if the cheque images satisfy a plurality of parameter-based image metrics (step 104). If the cheque images do not satisfy one or more of the parameter-based image metrics, the cheque images are designated as being of unsuitable quality and the cheque image evaluation process is terminated (step 106). If the cheque images satisfy each of the parameter-based image metrics at step 104, the cheque images are examined to determine if the cheque images satisfy a plurality of order-dependent image metrics (step 108). If the cheque images do not satisfy one or more of the order-dependent image metrics, the cheque images are designated as being of unsuitable quality and the cheque image evaluation process is terminated (step 106). If the cheque images satisfy each of the order-dependent image metrics, the cheque images are deemed to be of sufficient quality and are passed on to downstream processing equipment for further processing (step 110).

In this embodiment, at step 104, the cheque images are examined to determine if the cheque images satisfy five (5)

parameter-based image metrics. The five (5) parameter-based image metrics relate to image size and are evaluated by examining parameters of the cheque images. In particular, the five parameter-based image metrics comprise an oversize image metric, an undersize image metric, a minimum compressed image size metric, a maximum compressed image size metric and a front-back image dimension mismatch metric. The five parameter-based image metrics are considered in the above order although those of skill in the art will appreciate that the parameter-based image metrics may be considered in any order. During evaluation of the cheque images to determine if the cheque images satisfy a parameter-based image metric, if the cheque images are deemed not to satisfy the parameter-based image metric, the cheque evaluation image evaluation process is terminated at step 106 avoiding the need to evaluate downstream parameter-based and order-dependent image metrics. If the cheque images are deemed to satisfy the parameter-based image metric, the next parameter-based image metric is considered. This process continues until either the cheque image evaluation process is terminated at step 106 or all of the parameter-based image metrics are deemed to be satisfied.

During evaluation of the cheque images to determine if the cheque images satisfy the oversize image metric, the width and height of each of the front and back cheque images are compared to maximum width and maximum height threshold values. If the width or height of either of the cheque images is greater than the corresponding maximum threshold value, the oversize image metric is deemed not to be satisfied. A fail flag is then set and the cheque image evaluation process is terminated at step 106. If the oversize image metric is satisfied, a pass flag is set and the cheque images are checked to determine if they satisfy the undersize image metric. During evaluation of the cheque images to determine if the cheque images satisfy the undersize image metric, the width and height of each of the front and back cheque images are compared to minimum width and minimum height threshold values. If the width or height of either of the cheque images is less than the corresponding minimum threshold value, the undersize image metric is deemed not to be satisfied. A fail flag is then set and the cheque image evaluation process is terminated at step 106. If the undersize image metric is satisfied, a pass flag is set and the cheque images are checked to determine if they satisfy the minimum compressed image size metric.

During evaluation of the cheque images to determine if the cheque images satisfy the minimum compressed image size metric, the file sizes of the front and back cheque images are compared to a minimum file size threshold value. If the file size of either of the cheque images is less than the minimum file size threshold value, the minimum compressed image size metric is deemed not to be satisfied. A fail flag is then set and the cheque image evaluation process is terminated at step 106. If the minimum compressed image size metric is satisfied, a pass flag is set and the cheque images are checked to determine if they satisfy the maximum compressed image size metric. During evaluation of the cheque images to determine if the cheque images satisfy the maximum compressed image size metric, the file sizes of the front and back cheque images are compared to a maximum file size threshold value. If the file size of either of the cheque images is greater than the maximum file size threshold value, the maximum compressed image size metric is deemed not to be satisfied. A fail flag is then set and the cheque image evaluation process is terminated at step 106. If the maximum compressed image size metric is satisfied, a pass flag is set and the cheque images are checked to determine if they satisfy the front-back image dimension mismatch metric.

During evaluation of the cheque images to determine if the cheque images satisfy the front-back image dimension mismatch metric, the absolute differences between the width and height of the front and back cheque images are compared to maximum threshold values. If either of the absolute differences is greater than the corresponding maximum threshold value, the front-back image dimension mismatch metric is deemed not to be satisfied. A fail flag is then set and the cheque image evaluation process is terminated at step 106. If the front-back image dimension mismatch metric is deemed to be satisfied, a pass flag is set. Setting of the five (5) pass flags signifies that all of the parameter-based image metrics have been satisfied. As a result, the cheque evaluation process proceeds to step 108 so that the order-dependent image metrics can be evaluated.

In this embodiment, at step 108, the cheque images are examined to determine if the cheque images satisfy seven (7) order-dependent image metrics. The seven (7) order-dependent image metrics comprise an excessive spot noise image metric, a framing error image metric, an excessive skew image metric, a folded or torn corner image metric, a folded or torn edge image metric, a carbon strip image metric and a piggyback image metric.

Figure 3:
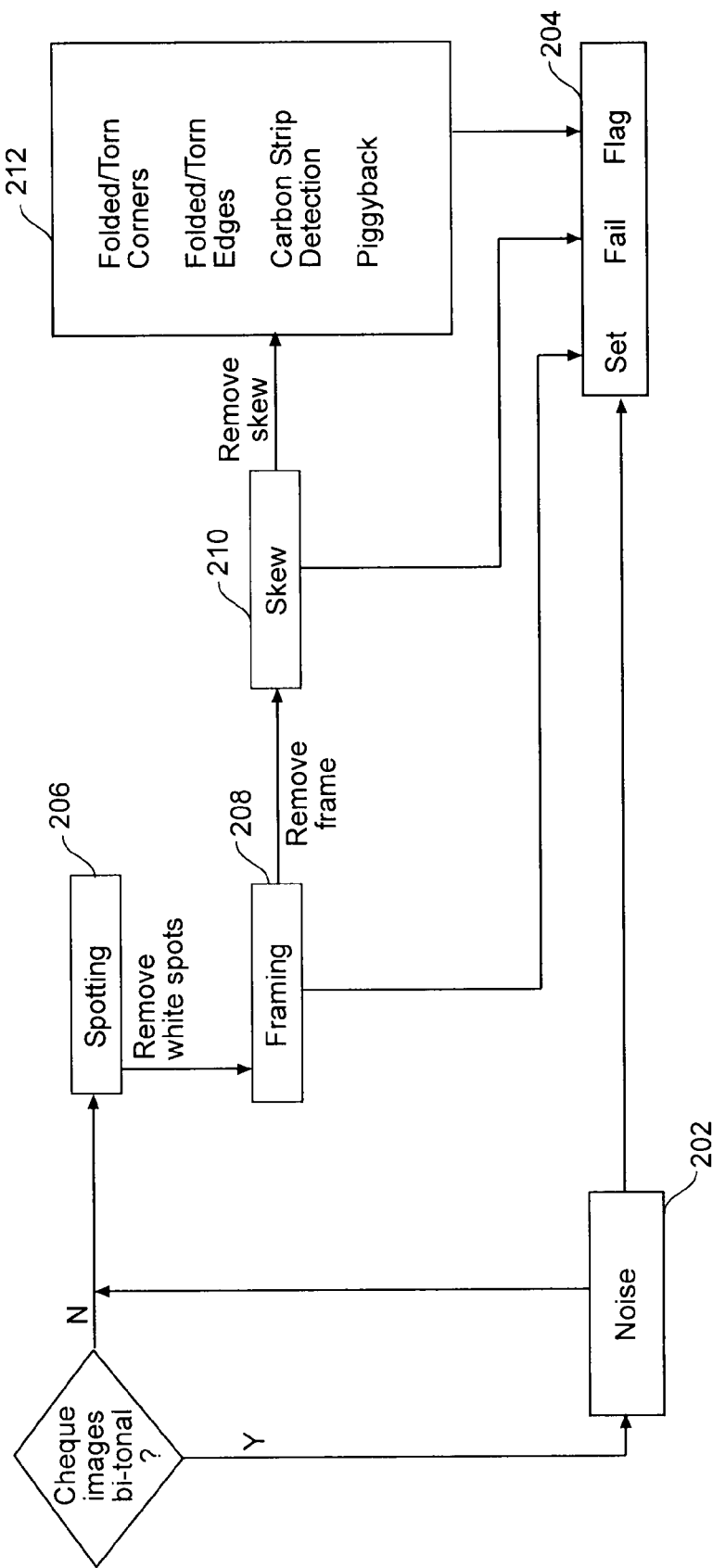
FIG. 3 is a flow diagram showing the steps performed during assessment of order-dependent image metrics.

Turning now to FIG. 3, a flow diagram showing the order in which the order-based image metrics are evaluated is shown. As can be seen, the cheque images are firstly examined to determine if the cheque images are bi-tonal (step 200). If the cheque images are bi-tonal, the cheque images are examined to detect the existence of excessive spot noise in the images (step 202). If the spot noise level in either of the cheque images exceeds a threshold level, a fail flag is set (step 204) and the cheque evaluation process is terminated at step 106. If the spot noise level is within acceptable limits or if at step 200 it is determined that the cheque images are not bi-tonal, the cheque images are pre-processed to remove spotting in the cheque images if such spotting exits (step 206). Once spotting has been removed from the cheque images, the cheque images are examined to detect framing errors (step 208). If framing errors in either of the cheque images exist that exceed a threshold level, a fail flag is set (step 204) and the cheque evaluation process is terminated at step 106. If the framing errors are within acceptable limits, frames in the cheque images are removed and the cheque images are examined to detect skew errors (step 210). If skew errors in either of the cheque images exist that exceed a threshold level, a fail flag is set (step 204) and the cheque evaluation process is terminated at step 106. If the skew errors are within acceptable limits, the skew in the cheque images is removed.

With spotting, framing errors and skew removed from the cheque images, the cheque images are examined firstly to detect folded or torn corners, then to detect folded or torn edges, then to detect the existence of a carbon strip and lastly to detect the existence of document piggyback (step 212). If during consideration of any of these image metrics, the cheque images are deemed not to satisfy the image metric under consideration, a fail flag is set (step 204) and the cheque image evaluation process is terminated at step 106 avoiding the need to consider downstream image metrics. This process continues until either the cheque image evaluation process is terminated at step 106 or all of the image metrics are deemed to be satisfied. The evaluation order of these four image metrics can be varied if desired.

Figure 4:
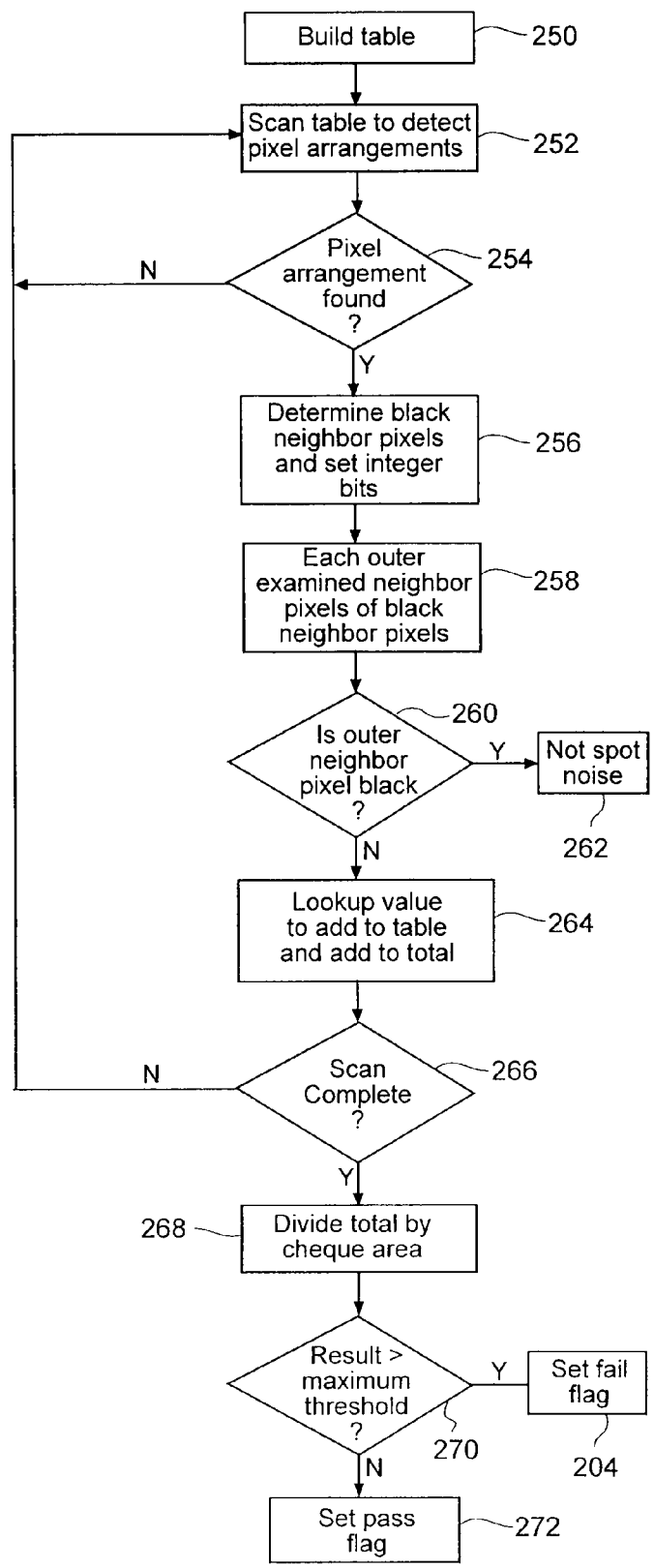
FIG. 4 is a flowchart showing the steps performed to detect spot noise in bi-tonal cheque images.

As mentioned above, at step 202, the cheque images are evaluated to detect the existence of excessive spot noise if the cheque images are bi-tonal. Spot noise is defined as any 3×3 or smaller cluster of connected black pixels including diagonals that is completely surrounded by white pixels. FIG. 4 shows the steps performed to detect spot noise in bi-tonal cheque images. In order to detect spot noise in bi-tonal cheque images, each cheque image is examined to detect one (1), two (2) or three (3) continuous or connected black pixel arrangements or black pixel, white pixel, black pixel arrangements. For each spot noise pixel arrangement that is located, the neighboring pixels surrounding the located spot noise arrangement are examined. The examined neighboring pixels are flagged depending on whether the neighboring pixels are black or white and for each combination of neighboring pixels, a weighting for the spot noise is given.

To improve run time during spot noise detection, each pixel line of each cheque image is scanned once. During examination of each pixel line in each cheque image, a row of a table is populated based on black pixels along the pixel line. In particular, for each black pixel in the first pixel line, a bin in the row corresponding to the location of the black pixel is incremented. A similar procedure is performed for each consecutive pixel line. Thus, the bins in the row corresponding to the locations of the black pixels in the row are incremented. As will be appreciated, when the height of spot noise is two (2) pixels (i.e. the spot noise spans two pixel lines), the spot noise is counted twice. To take double counting into account, a look-up table is constructed to identify bins having double counts.

With the rows of the table populated, the table is examined to detect patterns representing the spot noise pixel arrangements (step 202 and 204). When a spot noise pixel arrangement is detected, the neighboring pixels to the detected spot noise pixel arrangement that are black are determined and a flag for each black pixel is set. The flags are stored as a 16-bit integer identifying bins in the table corresponding to the locations of the black neighbor pixels (step 256). For each neighbor pixel that is black, the outer neighbor pixels of the black neighbor pixel are examined to determine if they are black (steps 258 and 260). If any of the outer neighbor pixels is black, the pixel arrangement is not within a 3×3 block of pixels and is not considered to be spot noise (step 262). Otherwise, the 16-bit integer is used to address the table and the counts in the bins identified by the integer are then summed. The look-up table is then examined to determine if any of the addressed bins are associated with double counts. If so, the sum is adjusted. The sum is then added to a current total representing overall spot noise in the cheque image (step 264). After the entire table has been examined (step 266), the current total is divided by the area of the cheque in the cheque image (step 268). If the spot noise per cheque area is greater than the maximum spot noise threshold value (step 270), the fail flag is set (step 204) and the cheque evaluation process is terminated at step 106. Otherwise, the pass flag is set (step 272) and the process proceeds to step 206).

Figure 5:
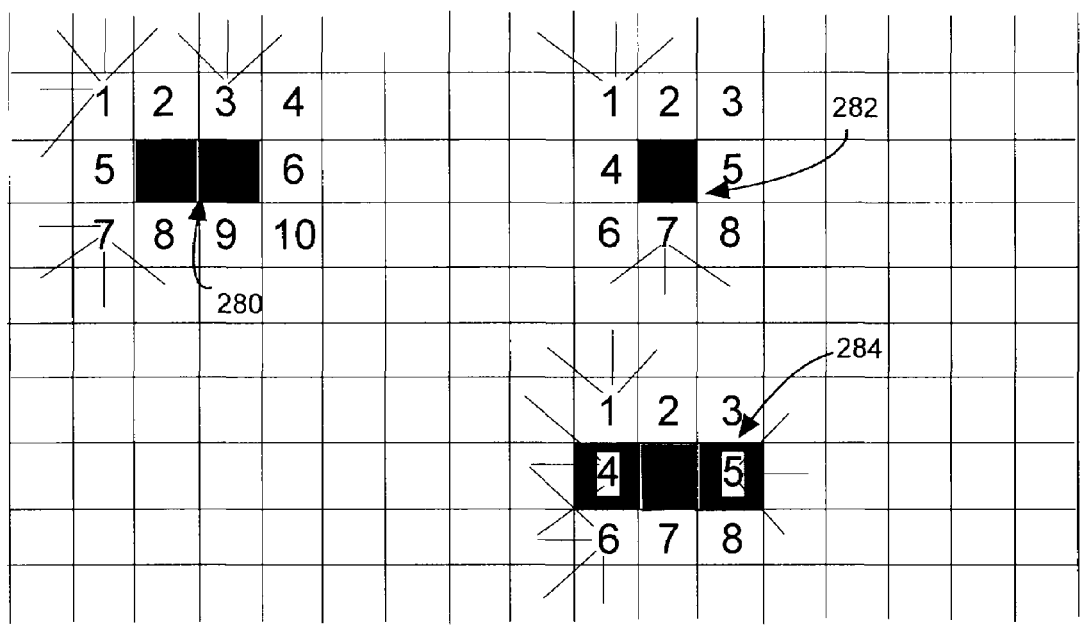
FIG. 5 is a cheque image including pixel arrangements representing spot noise.
Figures 6, 8:
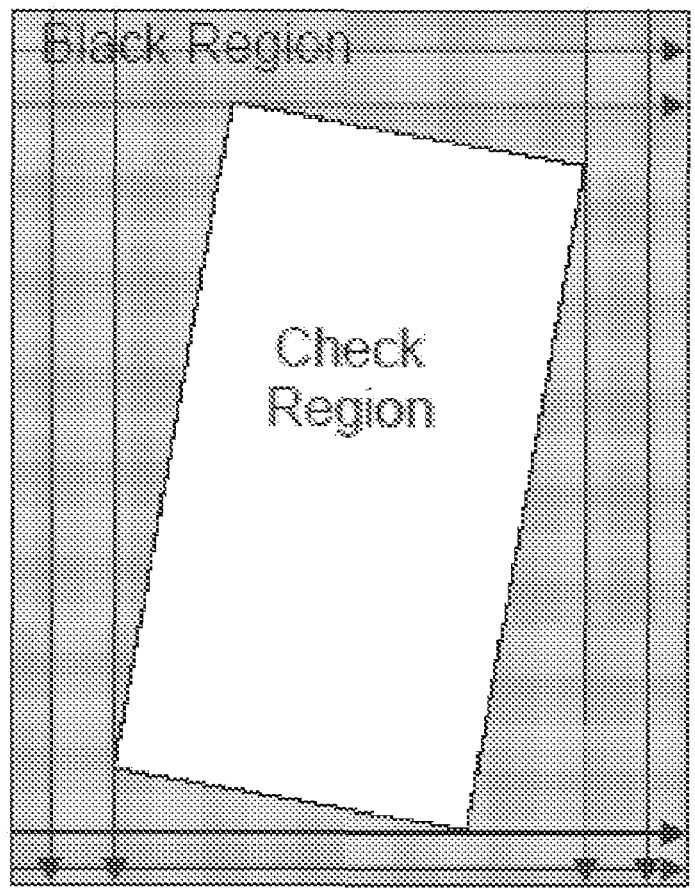
FIG. 6 is a table created during examination of cheque images to detect spot noise.
FIG. 8 is a cheque image showing determination of framing errors.

For example, turning now to FIG. 5, a cheque image comprising two consecutive black pixels 280, a single black pixel 282 and three consecutive black pixels 284 is shown. During scanning of the table at steps 252 and 254, these spot noise pixel arrangements are detected. In the example shown, neighboring pixels 1, 3 and 7 surrounding the black pixels 280 are black, neighboring pixels 1 and 7 surrounding black pixel 282 are black and neighboring pixels 1 and 6 surrounding pixels 284 are black. These neighboring black pixels are detected at step 256 and the flags are set and stored as 16-bit integers. The outer neighbor pixels of these black neighboring pixels are checked at step 260 to determine if they are black. FIG. 6 is an example of a 16-bit integer generated for the three consecutive black pixels 284. In this case, the x's represent the three consecutive black pixels 284. Pixels A1 to A6 represent neighbor pixels for which flags are set if the pixels are black.

Figure 7A:
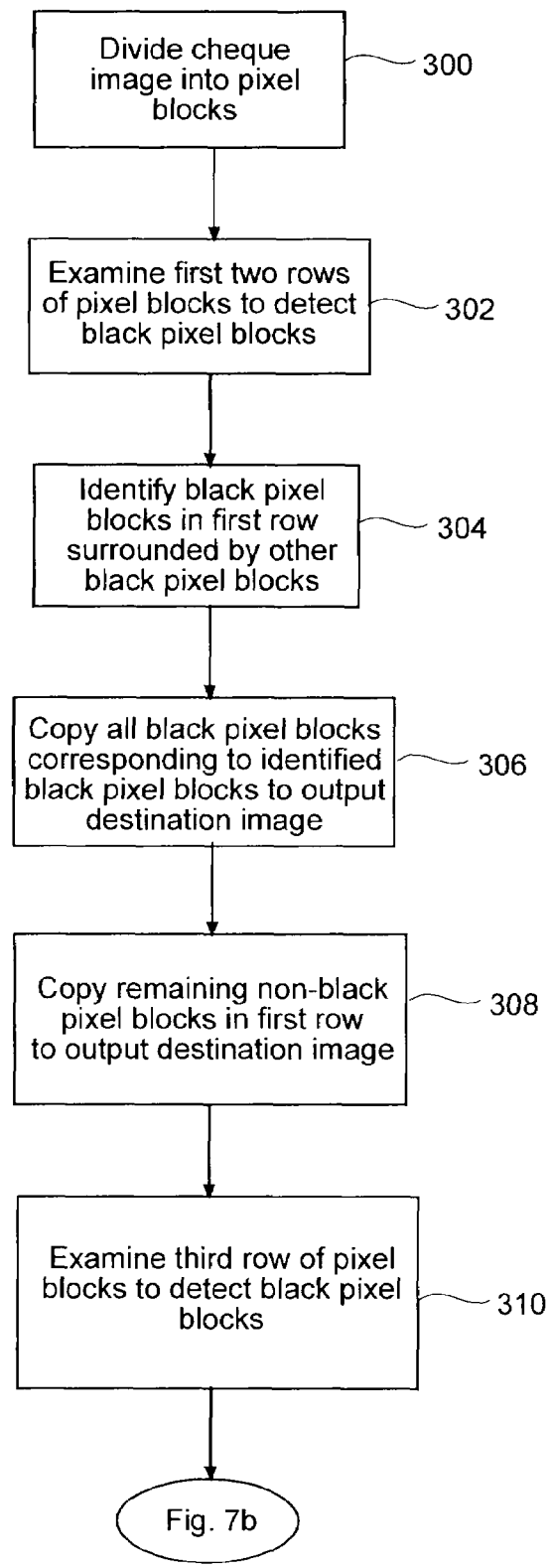
FIGS. 7a and 7b are flowcharts showing the steps performed to remove white noise from cheque images.
Figure 7B:
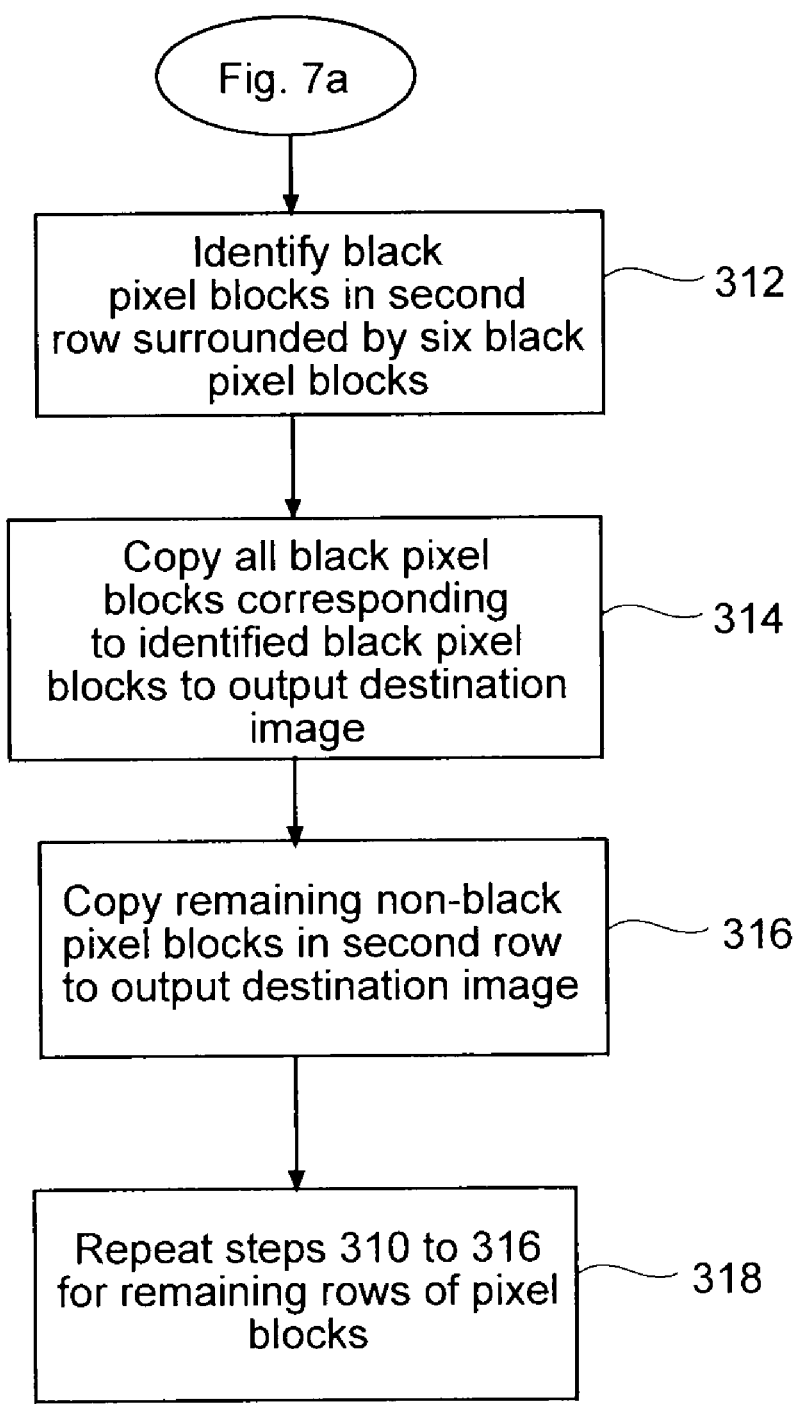

During processing of the cheque images at step 206 to remove spotting, the front and back cheque images are examined to detect white noise in the large black region or frame surrounding the cheque in each cheque image that is introduced during scanning of the cheque. FIGS. 7a and 7b show the steps performed to detect white noise in the cheque images. In particular, each cheque image is initially divided into N×N blocks of pixels (see step 300). For each block of pixels in the first two rows of blocks, a check is made to determine if the block of pixels is "black" (step 302). A block of pixels is deemed to be black if the average grayscale value of the pixels in the block is less than or equal to an average black pixel threshold value and if no pixel in the block has a pixel value greater than a white pixel threshold value. The black pixel blocks in the first row that are completely surrounded by other black pixel blocks are then identified (step 304). Blocks of pixels having all black pixels corresponding to the identified black pixel blocks in the first row are then copied to an output destination image (step 306). The remaining "non-black" blocks of pixels in the first row are copied to the output destination image (step 308).

The blocks in the third row are then checked to detect black pixel blocks (step 310). The black pixel blocks in the second row that are surrounded by six (6) black pixel blocks are identified (step 312). Blocks of pixels having all black pixels corresponding to the identified black pixel blocks in the second row are then copied to the output destination image (step 314). The remaining non-black pixel blocks in the second row are copied to the output destination image (step 316).

Steps 310 to 316 are then performed for the remaining rows of pixel blocks (step 318). When the last row of pixel blocks is reached, similar to the first row, black pixel blocks that are completely surrounded by black pixel blocks are identified and blocks of pixels having all black pixels corresponding to the identified black pixel blocks in the last row are copied to the output destination image. The remaining non-black pixel blocks in the last row are copied to the output destination image. In this manner, pixels of blocks having an average grayscale value less than or equal to the average black pixel threshold value are replaced with all black pixels thereby removing spotting from the frames in the cheque images.

As will be appreciated, the above process to remove white noise from each cheque image requires only a single pass of each cheque image making it fast. Also, as only information relating to a maximum of three rows of pixel blocks is needed during examination of each row of pixel blocks to determine the pixel information to be copied to the output destination image, memory requirements are reduced.

At step 208, during processing of the cheque images to detect framing errors, successive horizontal lines of pixels of the output destination image are scanned downward from the top of the output destination image as well as upward from the bottom of the output destination image. Similarly, successive vertical lines of pixels are scanned inward from the left edge of the output destination image as well as inward from the right edge of the output destination image. FIG. 8 shows successive horizontal and vertical pixel line scans of a cheque image. The scanned pixel lines are then examined to detect the cheque in the image and the size of the surrounding frame.

Figure 9A:
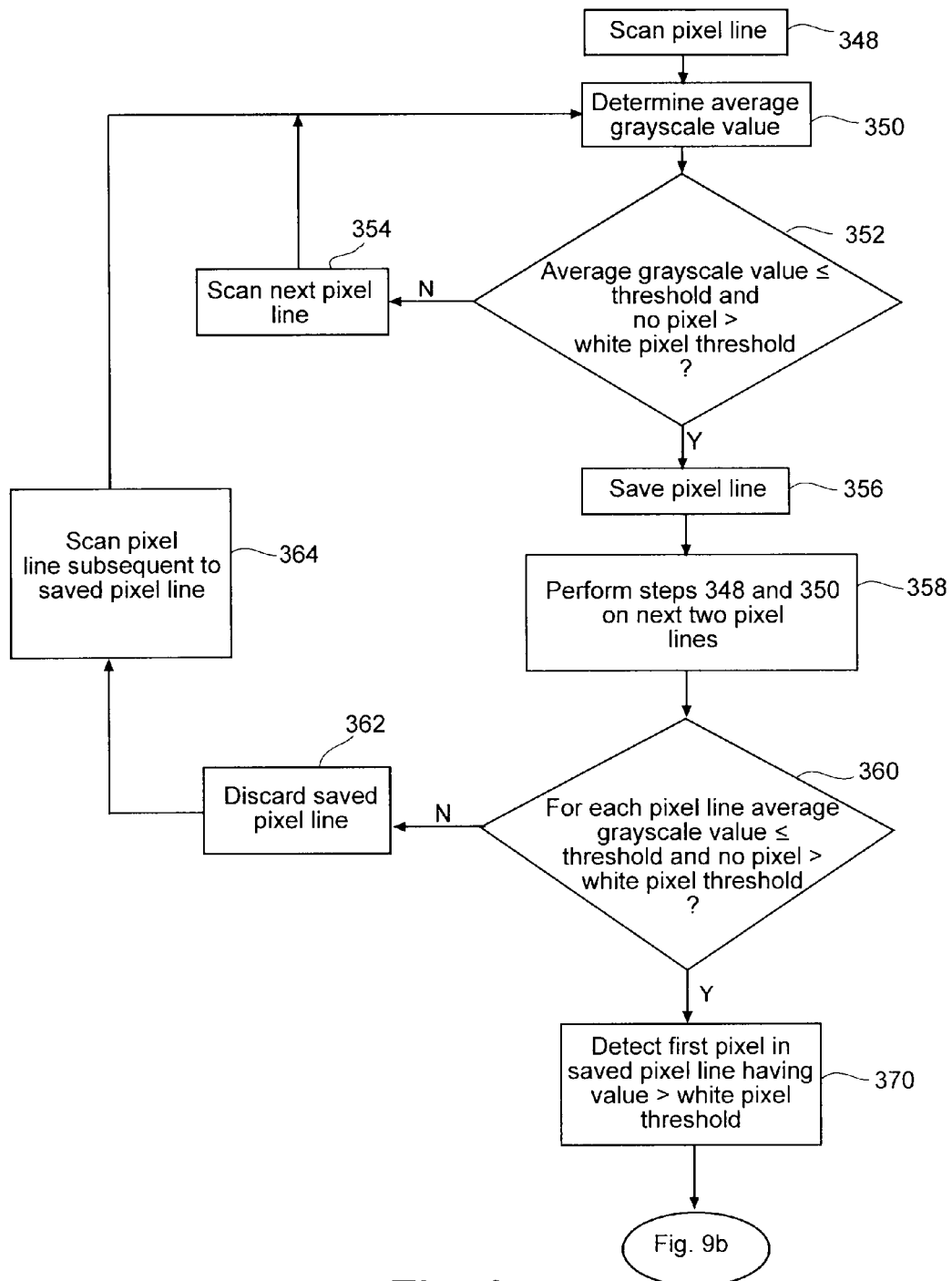
FIGS. 9a and 9b are flowcharts showing the steps performed to detect framing errors in cheque images.
Figure 9B:
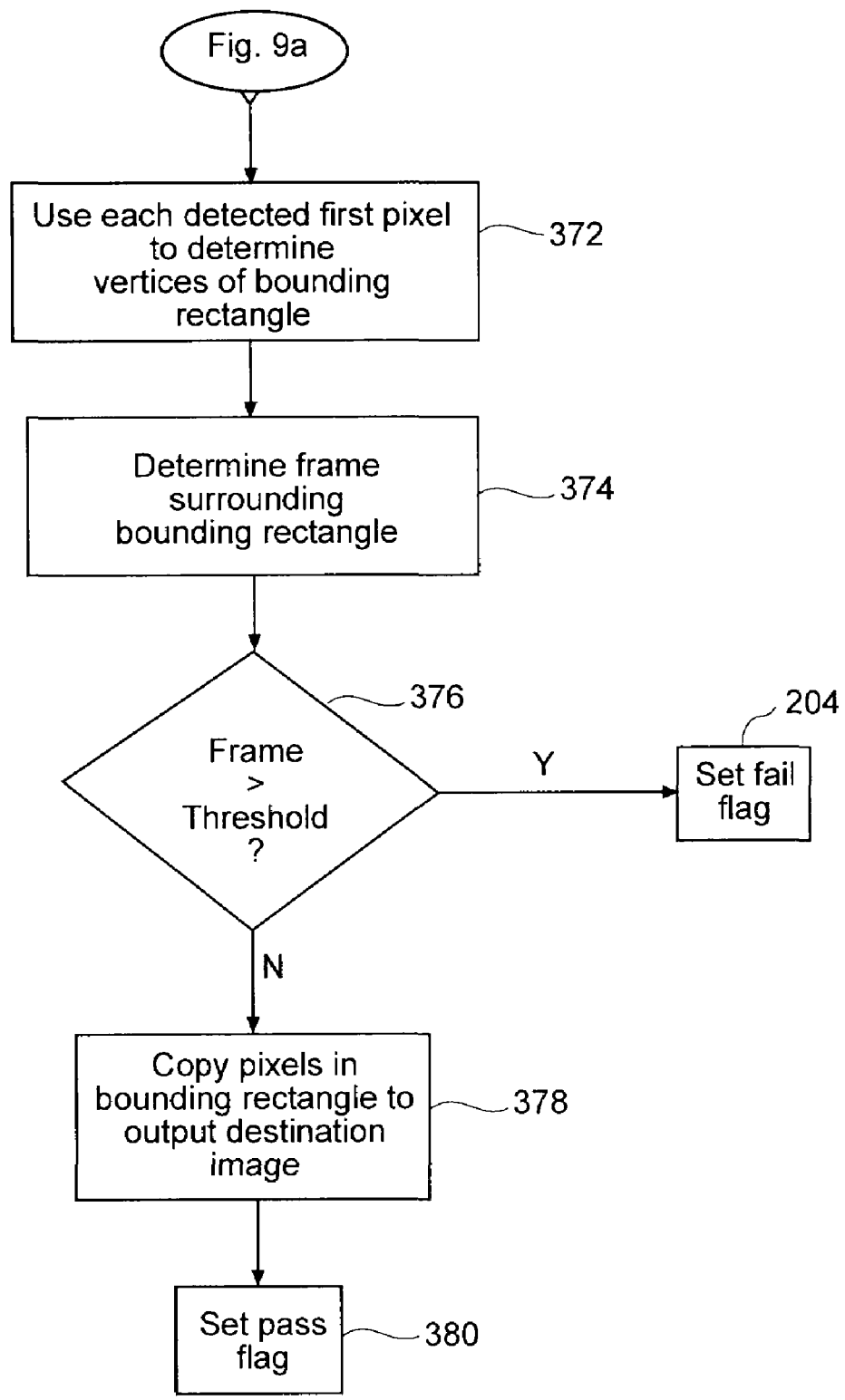

FIGS. 9a and 9b show the steps performed to detect the cheque in the images. For each of the four directions, the outer pixel line is scanned (step 348). The average grayscale value of the pixels in the scanned pixel line is then determined (step 350). If the average grayscale value is less than or equal to the average black pixel threshold and if a pixel in the scanned pixel line, that has a value greater than the white pixel threshold, does not exist (step 352), the next successive inward pixel line is scanned (step 354) and the process reverts back to step 350. If the average grayscale value is greater than the average black pixel threshold or if a pixel in the scanned pixel line has a value greater than the white pixel threshold value, the scanned pixel line is saved as the scanned pixel line likely passes through a significant portion of the cheque in the image (step 356). The above process is then performed on the next two successive inward pixel lines to confirm the result (step 358). Thus, for each of these two successive inward pixel lines, the average grayscale value of the pixels in the scanned pixel line is determined and checked to see if it is less than or equal to the average black pixel threshold. A check is also made to ensure no pixel in the pixel line has a value greater than the white pixel threshold (step 360). If the result is not confirmed, the saved pixel line is discarded (step 362) and the pixel line subsequent to the saved pixel line is scanned (step 364) before reverting back to step 350.

If the result is confirmed at step 360, the pixel line scanning is stopped. The first pixel in the saved pixel line having a value above the white pixel threshold is detected and saved (step 370). As the above process is performed in four directions, four pixels are detected. A bounding rectangle whose corners or vertices correspond to the detected four pixels is then determined (step 372). The frame surrounding the bounding rectangle is then determined (step 374) and examined to determine if the frame size exceeds a maximum frame size threshold value (step 376). If the frame size exceeds the maximum frame size threshold value, the fail flag is set (step 204) and the cheque evaluation process is terminated at step 106. If the frame size is less than or equal to the maximum frame size threshold value, the pixels of the cheque image within the bounding rectangle are copied to a frame error corrected output destination image (step 378) and the pass flag is set (step 380).

At step 210, the pixels of the frame error corrected output destination image along the row and column that intersect each vertice of the bounding rectangle are examined to determine if the pixels have values above the white pixel threshold value. The number of pixels having values above the white threshold level is then compared to a maximum threshold value. If the number for at least two of the rows and columns is less than or equal to the maximum threshold value, signifying that a significant portion of the row and/or column does not pass through the cheque in the image, skew correction is deemed necessary. If the number for at least two of the rows and columns is greater than the maximum threshold value, skew correction is deemed unnecessary.

Figure 10A:
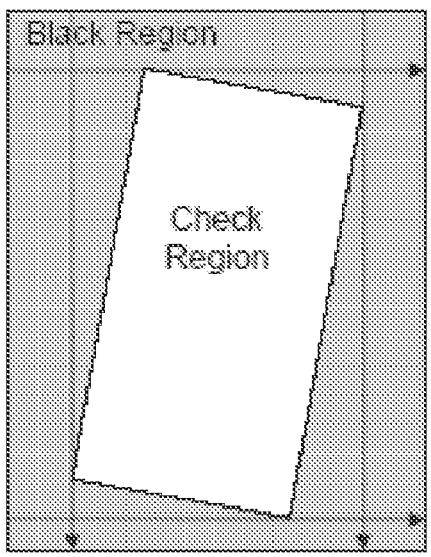
FIGS. 10a and 10b are skewed and non-skewed cheque images.
Figure 10B:
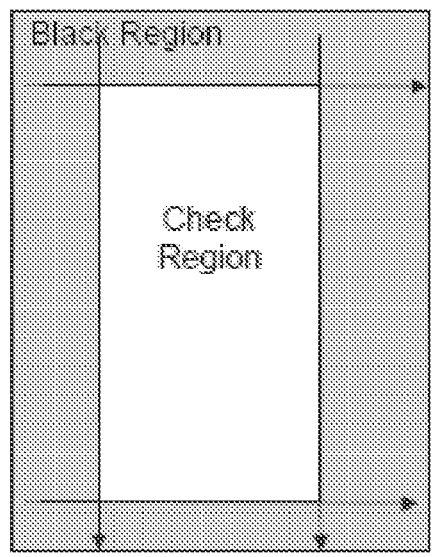

For example, FIG. 10a shows a bounding rectangle where skew correction is necessary while FIG. 10b shows a bounding rectangle where skew correction is not necessary. In the case of FIG. 10a, the number of pixels having values above the white threshold level along the rows and columns that intersect the bounding rectangle vertices is below the maximum threshold value signifying that skew correction is required. In the case of FIG. 10b, the number of pixels having values above the white threshold level along the rows and columns that intersect the bounding rectangle vertices exceeds the maximum threshold value signifying that no skew correction is required.

Figure 11:
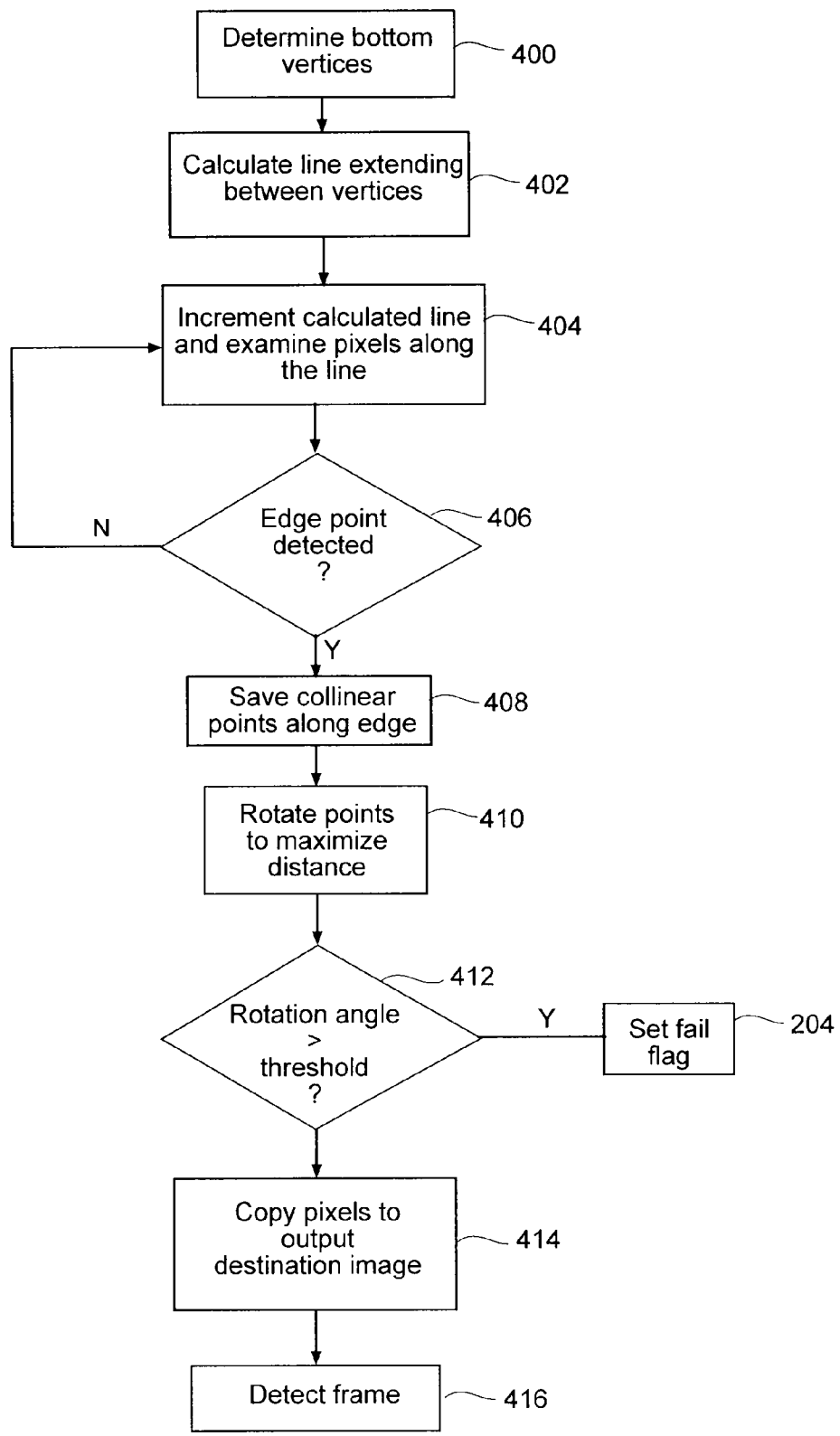
FIG. 11 is a flowchart showing the steps performed during skew correction.

If skew correction is deemed to be necessary, a check is made to ensure that the vertices at the top corners of the bounding rectangle are actually along the edge of the cheque in the image. To do this, two bottom vertices are found by selecting the two points on the cheque border having the greatest x values and intersecting with the bounding rectangle assuming that the cheque is in a vertical orientation in the image (see step 400 in FIG. 11). These bottom vertices are used as the datum due to the fact that many cheque scanners require the bottom edge of the cheque to be aligned prior to scanning. A line extending between the two bottom vertices is then calculated (step 402). The calculated line is incremented while maintaining its parallelism with the previous line and the pixels along the line corresponding to the bounding rectangle perimeter are examined (step 404) to determine if these co-linear pixels are at the edges of the cheque (step 406). If not, the process reverts back to step 404. When a line is detected having co-linear pixels positioned on the bounding rectangle perimeter that coincide with the edges of the cheque, the locations of the co-linear pixels are saved (step 408). The calculated line is then incremented and a check is made to determine if it includes only pixels having values exceeding the black pixel threshold. If not, the calculated line is incremented and the check is performed again. This process continues until a line is found that includes only pixels having values exceeding the black pixel threshold. When such a line is found, the previous line is examined to detect the first pixel having a value below the black pixel threshold. The location of this pixel is designated as a new top vertex of the cheque in the image.

The two saved collinear points are then rotated along the edge until their y distances, that is their distance along the y direction, are maximized (step 410). The angle of rotation is then compared to a maximum skew threshold value (412). If the angle of rotation is above the maximum skew threshold angle, the fail flag is set (step 204) and the cheque evaluation process is terminated at step 206. If the angle of rotation is equal to or less than the maximum skew threshold value, for each block of nine pixels in the rotated image, the first pixel is copied to a skew corrected output destination image (step 414). As a result, the skew corrected output destination image is lower in resolution. The downsampled skew corrected output destination image is however sufficient for further processing. The skew corrected output destination image is also processed in the same manner as described with reference to FIGS. 9a and 9b to detect and remove the frame surrounding the skew corrected bounding rectangle (step 416) thereby to generate a frame and skew corrected output destination image.

Figure 12:
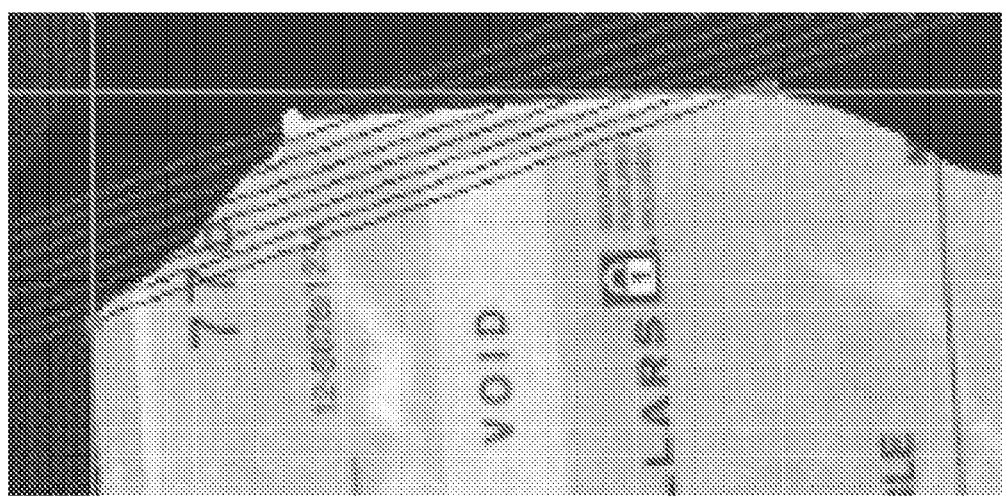
FIG. 12 is a cheque image showing determination of collinear points along an edge of a cheque image.

FIG. 12 shows incremented calculated lines adjacent the top left corner of a cheque image that are examined to detect the new vertex and co-linear points at opposite edges of the cheque image.

Figure 13:
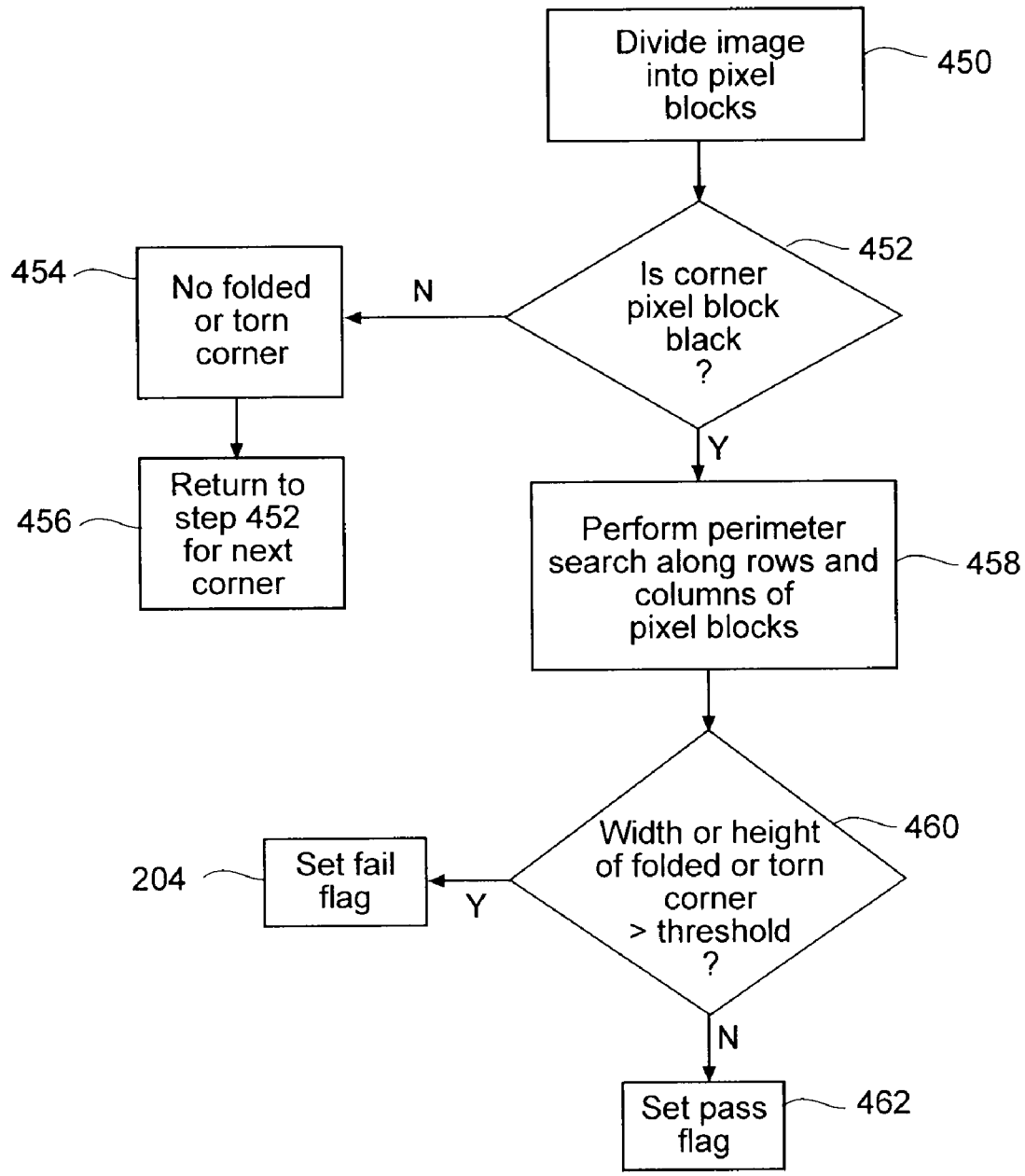
FIG. 13 is a flowchart showing the steps performed to detect folded or torn cheque corners.

At step 212, in order to detect folded or torn cheque corners, the frame and skew corrected output destination image is divided into N×N blocks of pixels (see step 450 in FIG. 13). Beginning with the pixel block at the top left corner of the frame and skew corrected output destination image, a check is made to determine whether the pixel block is black in the same manner described previously (step 452). If not, a fold or tear at the corner of the cheque in the image is deemed not to exist (step 454). The pixel block at the next corner of the frame and skew corrected output destination image is then checked to determine if it is black (step 456). At step 452, if the block of pixels is deemed to be black, a perimeter search along the row and column of pixel blocks that intersect the top left corner pixel block is performed (step 458). During the perimeter search, the pixel block adjacent the corner pixel block in the same row is examined to determine if the pixel block is black. If so, the next pixel block in the row is examined to determine if the pixel block is black. If so, the same process is performed for the next pixel block in the row and so on. This process continues until a non-black pixel block is detected. When a non-black pixel block in the row is detected, a similar check is made with respect to the adjacent pixel block in the same column as the detected non-black pixel block. If that pixel block is determined to be black, the process returns to the first row and the next pixel block is examined to determine if it is black. Otherwise, a similar check is made with respect to the next adjacent pixel block in the same column.

Figure 14:
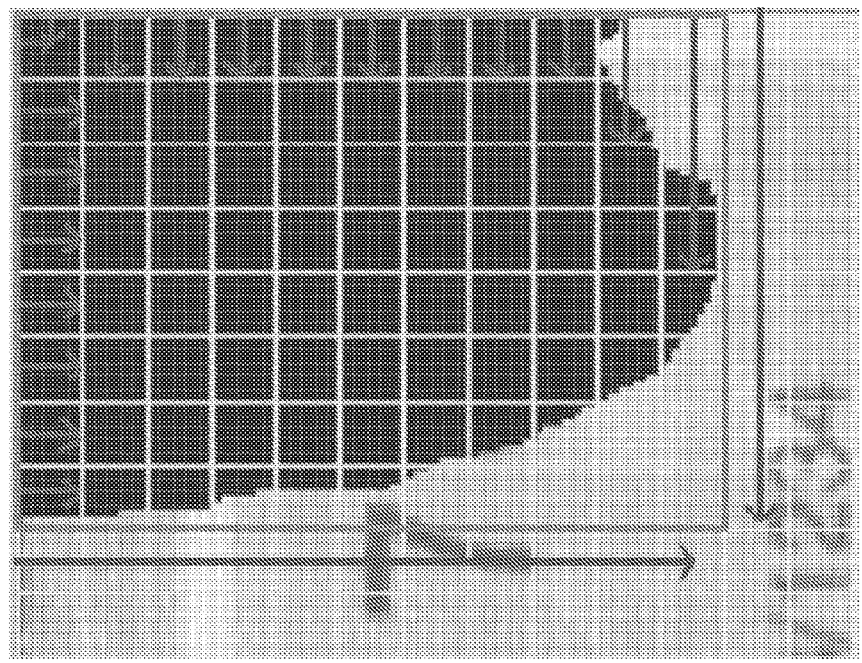
FIG. 14 shows a torn cheque corner delineated by an intersecting column and row of non-black pixel blocks.

At the same time, a similar procedure is performed with respect to the pixel blocks in each column. When a column of non-black pixel blocks and a row of non-black pixel blocks that intersect are detected, the boundary of a torn or folded corner is delineated. FIG. 14 shows a torn cheque corner delineated by an intersecting column and row of non-black pixels blocks. With the boundary of the torn or folded corner delineated, the height and width of the delineated folded or torn corner are compared to the maximum width and height threshold values (step 460). If the width or height of the delineated folded or torn corner boundary is greater than the corresponding maximum threshold value, the fail flag is set (step 204) and the cheque evaluation process is terminated at step 106. Otherwise the pass flag is set (step 462) and the next order-dependent image metric is evaluated. As will be appreciated, the above process is performed for each corner of each image.

Figure 16:
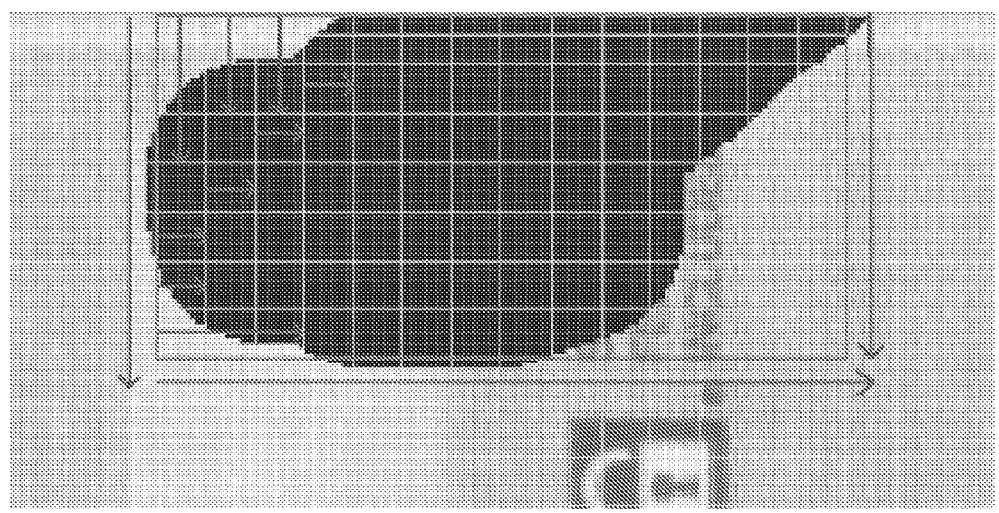
FIG. 16 shows a torn cheque edge delineated by a rectangular band of non-black pixel blocks.
Figure 15:
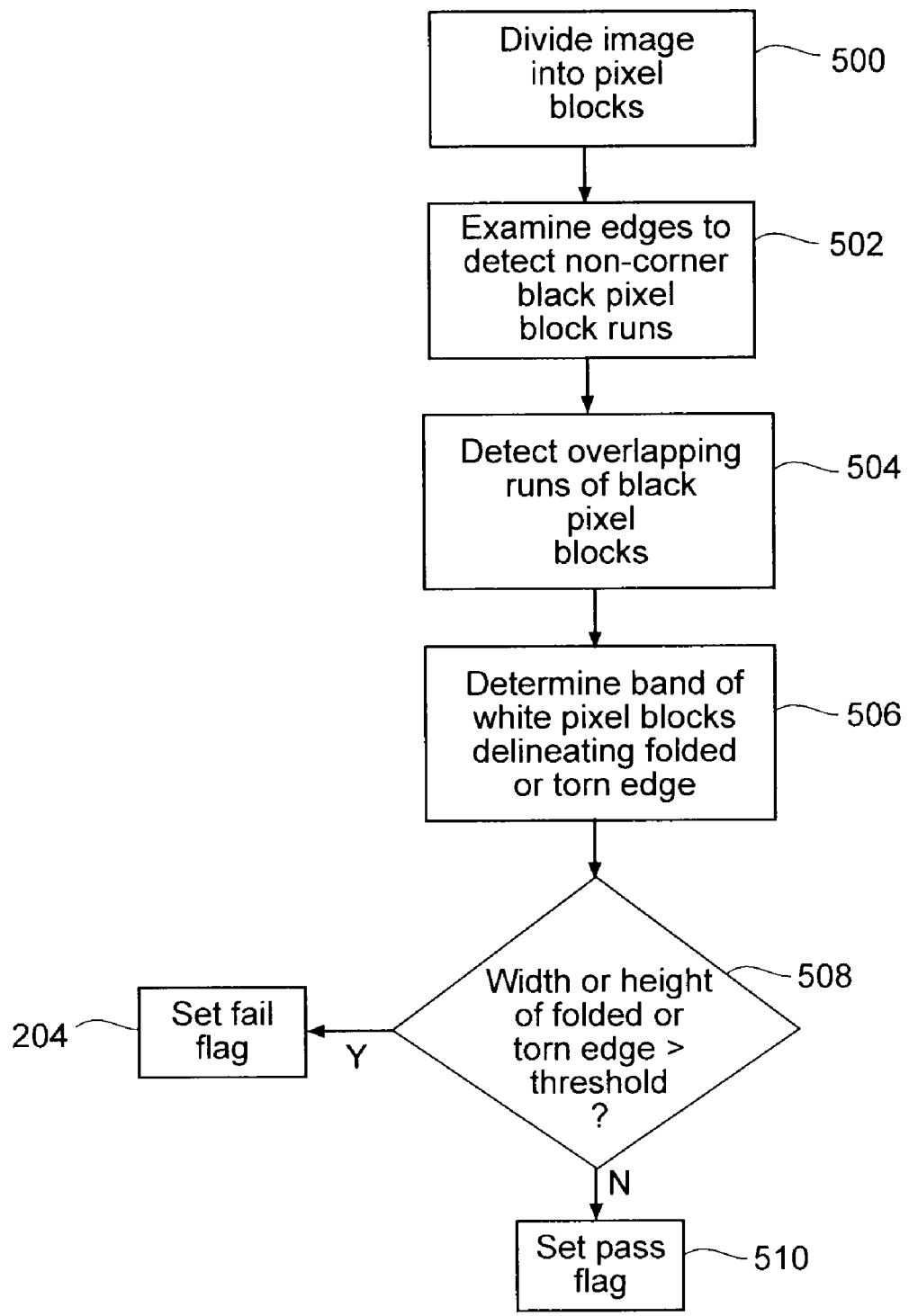
FIG. 15 is a flowchart showing the steps performed to detect folded or torn cheque edges.

In order to detect a folded or torn cheque edge, a process similar to that described above with respect to determining folded or torn cheque corners is performed. During this process, the frame and skew corrected output destination image that has been divided into N×N blocks of pixels is used (step 500 in FIG. 15). Each edge of the cheque image is examined to determine if any contiguous runs of black pixel blocks that do not start at or end at a corner of the bounding rectangle exist (step 502). For each contiguous run of black pixel blocks that is found, the ends of the run of black pixel blocks are saved. The pixel blocks of the successive inward line of pixel blocks are then examined to determine if a contiguous run of black pixel boxes that overlaps with the run of black pixel blocks in the previous line of pixel blocks exists (step 504). If so, the ends of the run of black pixel blocks are saved and the pixel blocks of the next successive inward line of pixel blocks are examined. This process is carried out until no overlapping run of black pixel blocks is found in a successive inward line of pixel blocks. The saved end locations of the overlapping runs of black pixel blocks are then used to determine a rectangular band of white pixel blocks that surrounds the overlapping continuous runs of black pixel boxes and hence delineates the folded or torn cheque edge (step 506). FIG. 16 shows a torn cheque edge delineated by a rectangular band of white pixel blocks. The height and width of the delineated folded or torn corner are then compared with maximum width and height edge tear thresholds (step 508). If the width or height of the delineated folded or torn edge exceeds the corresponding edge tear threshold value, the fail flag is set (step 204) and the cheque evaluation process is terminated at step 106. Otherwise the pass flag is set (step 510) and the next order-dependent image metric is evaluated.

In order to determine if the cheque image includes a carbon strip, the frame and skew corrected output destination image is scanned to detect successive contiguous rows of pixels whose average grayscale value is greater than the average black threshold value. If such contiguous rows of pixels exist, the height of the successive contiguous rows of pixels is examined to determine if the dimension is within the ANS X9.100-11 2004 standard, which establishes where a carbon strip may be located on a cheque. If the dimension of the successive contiguous pixel rows falls within the ANS standard signifying the existence of a carbon strip, the fail flag is set (step 204) and the cheque evaluation process is terminated at step 106. Otherwise the pass flag is set and the next order-dependent image metric is evaluated.

Figure 17:
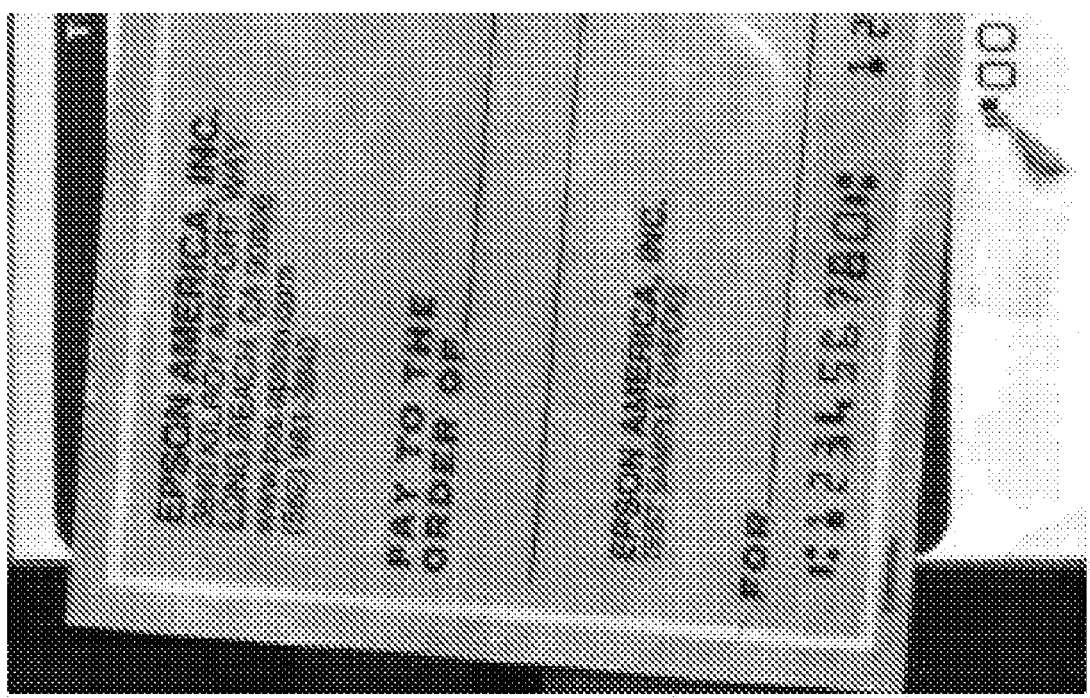
FIG. 17 is a cheque image showing cheque piggyback.

In order to determine if document piggyback exists, (i.e. a situation where overlapping cheques are simultaneously scanned, a check initially is made to determine if a double scan flag has been set by the scanner used to capture the cheque images and that the MICR from the scanner hardware is valid. If a double scan flag has been set or if the MICR from the scanner hardware is not valid, the fail flag is set (step 204) and the cheque evaluation process is terminated at step 106. If no double scan flag has been set and if the MICR from the scanner hardware is valid, the frame and skew corrected output destination image is examined to determine if a partial line along the left or bottom edges of the cheque image exists that is parallel to the edge of the cheque in the image, as such a line is likely to be the border of a cheque stuck to the bottom of the imaged cheque. FIG. 17 shows a piggyback situation where two cheques are in the same image.

To detect such a partial line along the edge of the cheque, a histogram that is a projection of black pixels along the vertical axis in FIG. 17 is initially built. During building of the projection histogram, each row of pixels is examined to detect black pixels. When a black pixel is detected, the bin of the histogram corresponding to the detected black pixel location is populated. To detect a partial line along the bottom edge of the cheque, a histogram that is a projection of black pixels along the horizontal axis in FIG. 17 is initially built. During building of this projection histogram, each column of pixels is examined to detect black pixels. When a black pixel is detected, the bin of the histogram corresponding to the detected black pixel location is populated.

With the projection histograms built, for each projection histogram the bin with the greatest population is determined. The two bins on either side of the most populated bin are examined to determine if the populations of these bins are greater than the minimum distance threshold value. If so, the populations of these five bins are examined to detect one of two conditions signifying document piggyback. Specifically, a check is made to determine if the population of one of the bins exceeds a long piggyback threshold value or if the population of at least one bin on either side of the most populated exceeds a smaller piggyback length threshold. If one or both of these conditions exist, then document piggyback is detected. In this case, the fail flag is set (step 204) and the cheque evaluation process is terminated at step 106. Otherwise the pass flag is set and the order-dependent image metrics are deemed to be satisfied.

Although the cheque evaluation process is described as being terminated whenever a parameter-based or order-dependent image metric is not satisfied, all of the parameter-based and image-dependent image metrics can be evaluated before a decision to terminate the cheque evaluation process is made. Also, while specific reference is made to examining cheques, the evaluation may of course be carried out on images of other documents of value to evaluate the quality of the images. The number and type of parameter-based and order-dependent image metrics that are evaluated can also be varied to suit the particular document evaluation environment.

The cheque image evaluation application may comprise program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although a particular embodiment has been described, those of skill in the art will appreciate that variations and modifications may be made without departing from the spirit and scope thereof as defined by the appended claims.

What is claimed is:

1. A method of evaluating the quality of an image of a document comprising:
   using a computer processing unit to perform the following:
   examining the image to determine if the image satisfies at least one parameter-based image metric; and
   examining the image to determine if the image satisfies a plurality of order-dependent image metrics; and
   wherein during examining of the image to determine if the image satisfies a plurality of order-dependent image metrics, said image is examined firstly to detect the existence of a frame surrounding the document, then to detect document skew, and then to detect at least one of (i) folded or torn document corners, (ii) folded or torn document edges, (iii) the existence of a carbon strip on the document and (iv) document piggyback; and
   wherein frame existence detecting comprises:
   determining a bounding region delineating the document in the image; and
   comparing the size of the frame surrounding said bounding region with a threshold to determine if said frame exceeds a frame size limit.

2. The method of claim 1 wherein said image is firstly examined to determine if the image satisfies the at least one parameter-based image metric.

3. The method of claim 2 wherein said first examining comprises examining the image to determine if the image satisfies a plurality of parameter-based image metrics.

4. The method of claim 3 wherein during said first examining, image dimensions are compared with thresholds to determine if the image satisfies the parameter-based image metrics.

5. The method of claim 4 wherein during said first examining, the image dimensions are examined to determine if the image is at least one of (i) oversized, (ii) undersized, (iii) has a file size below a minimum file size, and (iv) has a file size greater that a maximum file size.

6. The method of claim 5 wherein images of said document are examined in pairs and wherein during said first examining, the dimensions of the images in said pair are also compared to detect mismatched images.

7. The method of claim 6 wherein said document is a cheque.

8. The method of claim 7 wherein during examining of the image to determine if the image satisfies a plurality of order-dependent image metrics, said image is examined firstly to detect the existence of a frame surrounding the document, then to detect document skew, and then to detect each of (i) folded or torn document corners, (ii) folded or torn document edges, (iii) the existence of a carbon strip on the document and (iv) document piggyback.

9. The method of claim 4 wherein during said first examining, the image dimensions are examined to determine if the image is (i) oversized, (ii) undersized, (iii) has a file below a minimum file size, and (iv) has a file size greater than a maximum file size.

10. The method of claim 1 wherein each of (i) folded or torn document corners, (ii) folded or torn document edges, (iii) the existence of a carbon strip on the document and (iv) document piggyback is detected.

11. The method of claim 1 wherein said frame existence detecting further comprises:
    removing the frame from said image thereby to generate a frame corrected image if said frame does not exceed said frame size limit.

12. The method of claim 11 wherein document skew existence detecting comprises:
    rotating the bounding region in said frame corrected image to orient the bounding region; and
    comparing the angle of rotation with a threshold to determine if the angle of rotation exceeds a limit.

13. The method of claim 12 wherein said document skew existence detecting further comprises:
    detecting the frame surrounding the rotated bounding region if the angle of rotation does not exceed the limit; and
    removing the frame from said image thereby to generate a frame and skew corrected image.

14. The method of claim 13 wherein folded or torn document corner detecting comprises examining at least one corner of said frame and skew corrected image to detect the existence of a black pixel cluster.

15. The method of claim 14 wherein folded or torn document corner detecting further comprises:
    dividing the frame and skew corrected image into pixel blocks;
    examining pixels within the pixel block at the corner of said frame and skew corrected image to determine if the average value of said pixels is below a threshold level signifying the existence of said black pixel cluster; and
    if a black pixel cluster exists, similarly examining pixels of adjacent pixel blocks to delineate the boundaries of said black pixel cluster.

16. The method of claim 13 wherein folded or torn document edge detecting comprises examining at least one edge of said frame and skew corrected image to detect the existence of black pixel clusters.

17. The method of claim 16 wherein folded or torn document edge detecting further comprises:
    dividing the frame and skew corrected image into pixel blocks;
    examining pixels within each pixel block along the edge of said frame and skew corrected image to determine if the average value of said pixels is below a threshold level signifying the existence of said black pixel cluster; and
    if a black pixel cluster exists, similarly examining pixels of adjacent pixel blocks to delineate the boundaries of said black pixel cluster.

18. The method of claim 1 further comprising examining the image to detect spot noise therein.

19. An apparatus for evaluating the quality of an image of a document comprising:
    a parameter-based metrics evaluator examining the image to determine if the image satisfies at least one parameter-based image metric; and
    an order-dependent metrics evaluator examining the image to determine if the image satisfies a plurality of order-dependent image metrics; and
    said order-dependent metrics evaluator examines the image firstly to detect the existence a frame surrounding the document, then to detect document skew, and the to detect at least one of (i) folded or torn document corners, (ii) folded or torn document edges, (iii) the existence of a carbon strip on the document and (iv) document piggyback; and wherein frame existence detecting comprises:
determining a bounding region delineating the document in the image; and
comparing the size of the frame surrounding said bounding region with a threshold to determine if said frame exceeds a frame size limit.

20. An apparatus according to claim 19 wherein said parameter-based metrics evaluator examines the image to determine if the image satisfies a plurality of parameter-based image metrics.

21. An apparatus according to claim 19 wherein image evaluation is terminated if a parameter-based or order-dependent metric is not satisfied.

* * * * *

UNITED STATES PATENT AND TRADEMARK OFFICE
CERTIFICATE OF CORRECTION

PATENT NO. : 7,689,004 B2
APPLICATION NO. : 11/531146
DATED : March 30, 2010
INVENTOR(S) : Brian Keng et al.

It is certified that error appears in the above-identified patent and that said Letters Patent is hereby corrected as shown below:

Column 14,
Line 65, please change "skew, and the" to --skew, and then--.

Signed and Sealed this

First Day of June, 2010

David J. Kappos
*Director of the United States Patent and Trademark Office*